(12) United States Patent
Stover et al.

(10) Patent No.: US 12,306,425 B2
(45) Date of Patent: May 20, 2025

(54) POLARIZER FILM

(71) Applicant: 3M INNOVATIVE PROPERTIES COMPANY, St. Paul, MN (US)

(72) Inventors: Carl A. Stover, St. Paul, MN (US); Kristopher J. Derks, Woodbury, MN (US); Stephen A. Johnson, Woodbury, MN (US); Benjamin J. Forsythe, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 898 days.

(21) Appl. No.: 17/594,160

(22) PCT Filed: Apr. 10, 2020

(86) PCT No.: PCT/IB2020/053435
§ 371 (c)(1),
(2) Date: Oct. 5, 2021

(87) PCT Pub. No.: WO2020/222053
PCT Pub. Date: Nov. 5, 2020

(65) Prior Publication Data
US 2022/0179143 A1 Jun. 9, 2022

Related U.S. Application Data

(60) Provisional application No. 62/841,358, filed on May 1, 2019.

(51) Int. Cl.
*G02B 5/30* (2006.01)
*B32B 27/08* (2006.01)
(Continued)

(52) U.S. Cl.
CPC .............. *G02B 5/305* (2013.01); *B32B 27/08* (2013.01); *B32B 27/36* (2013.01); *C08G 63/00* (2013.01);
(Continued)

(58) Field of Classification Search
CPC ......... G02F 1/133528; G02F 1/133536; G02F 1/133545; B32B 27/08; B32B 27/36;
(Continued)

(56) References Cited

U.S. PATENT DOCUMENTS 5,882,774 A 3/1999 Jonza
6,498,683 B2 12/2002 Condo
(Continued)

FOREIGN PATENT DOCUMENTS

JP 2012212148 11/2012
JP 2013190577 9/2013
(Continued)

OTHER PUBLICATIONS

International Search Report for PCT International Application No. PCT/IB2020/053435, mailed on Jul. 7, 2020, 4 pages.

*Primary Examiner* — Thoi V Duong
(74) *Attorney, Agent, or Firm* — Clifton F. Richardson; Robert S. Moshrefzadeh; Jeffrey M. Olofson

(57) ABSTRACT

Multi-layer optical films that can be utilized as polarizer or mirror films and can be incorporated into optical stacks. The optical film includes a plurality of alternating polymeric first and second interference layers numbering greater than 50 and disposed between, and integrally formed with, first and second skin layers, each of the first and second interference layers has an average thickness less than 250 nm. The first and second interference layers and the first and second skin layers are compositions that include polyester.

20 Claims, 2 Drawing Sheets

(51) Int. Cl.
*B32B 27/36* (2006.01)
*C08G 63/00* (2006.01)
*G02B 5/08* (2006.01)
*G02F 1/1335* (2006.01)
*G02B 5/02* (2006.01)

(52) U.S. Cl.
CPC ........ *G02B 5/0841* (2013.01); *B32B 2250/05* (2013.01); *B32B 2250/244* (2013.01); *B32B 2270/00* (2013.01); *B32B 2307/418* (2013.01); *G02B 5/0242* (2013.01); *G02F 1/133536* (2013.01); *G02F 1/133545* (2021.01)

(58) Field of Classification Search
CPC .......... B32B 2250/05; B32B 2250/244; B32B 2270/00; B32B 2307/418; C08G 63/00
See application file for complete search history.

(56) References Cited

U.S. PATENT DOCUMENTS

| | | |
|---|---|---|
| 6,830,713 B2 | 12/2004 | Hebrink |
| 7,345,137 B2 | 3/2008 | Hebrink |
| 9,158,155 B2 | 10/2015 | Weber |
| 9,664,834 B2 | 5/2017 | Bösl |
| 10,545,273 B2 | 1/2020 | Stover |
| 2001/0011779 A1 | 8/2001 | Stover |
| 2017/0192130 A1 | 7/2017 | Liu |

FOREIGN PATENT DOCUMENTS

| | | |
|---|---|---|
| JP | 2016026325 | 2/2016 |
| JP | 2016118776 | 6/2016 |
| JP | 2018005246 | 1/2018 |
| JP | 2018536897 | 12/2018 |
| WO | 9517303 A1 | 6/1995 |
| WO | 2008127856 A1 | 10/2008 |
| WO | WO 2018-163009 | 9/2018 |
| WO | WO 2021-105852 | 6/2021 |

POLARIZER FILM

FIELD OF THE DISCLOSURE

The current disclosure relates to multi-layer optical films.

BACKGROUND

Polymeric films are used in a wide variety of applications. One particular use of polymeric films is in optical films to control light. Examples of optical film that control light include mirrors and reflective polarizers that reflect light of a given polarization or wavelength range. Such reflective films are used, for example, in conjunction with backlights in liquid crystal displays to enhance brightness. A reflective polarizing film may be placed between the user and the backlight to recycle the polarization state that becomes an image, thereby increasing brightness. A mirror film may be placed behind the backlight to reflect light towards the user; thereby enhancing brightness. Another use of polarizing films is in articles, such as sunglasses, to reduce light intensity and glare.

One type of polymer that is useful in creating polarizer or mirror films is a polyester. One example of a polyester-based polarizer includes a stack of polyester layers of differing composition. One configuration of this stack of layers includes a first set of birefringent layers and a second set of layers with an isotropic index of refraction. The second set of layers alternates with the birefringent layers to form a series of interfaces for reflecting light.

SUMMARY

Disclosed herein are multi-layer optical films (MOFs) that can be utilized as reflective polarizer or mirror films and can be incorporated into optical stacks. In some embodiments, the optical film (100) comprises a plurality of alternating polymeric first (10) and second (20) interference layers numbering greater than 50 and disposed between, and integrally formed with, first (30) and second (40) skin layers, each of the first and second interference layers having an average thickness less than about 250 nm. The first skin and the first interference layers having respective first and second compositions comprising polyester. The second skin layer comprising at least 70% by weight of polyethylene terephthalate (PET) and has an average thickness greater than about 50 micrometers. For substantially normally incident light (50) and for each wavelength in a predetermined wavelength range (60) extending at least from about 430 nm to at least about 600 nm, the optical film having an optical reflectance of at least 40% for a first polarization state (Px). Adjacent first and second interference layers having respective in plane indices of refraction: n1x and n2x along the first polarization state; n1y and n2y along an orthogonal second polarization state (Py); and n1z and n2z along a z-axis orthogonal to the first and second polarization states. For at least one wavelength (61) in the predetermined wavelength range: n1x is greater than each of n1y and n1z by at least 0.14; a difference between n1y and n1z is greater than about 0.07; a maximum difference between n2x, n2y and n2z is less than about 0.01; and a difference between n1x and n2x is greater than about 0.14.

Also disclosed are optical stacks. In some embodiments, the optical stack (200) comprises a structured film (110) comprising a plurality of structures (111), each structure comprising opposing facets (112, 113) meeting at a peak (114); the multi-layer optical film described above disposed on the peaks of the structures; and a first adhesive layer (120) bonding the optical film to the peaks of the structures, the optical stack having a flexural modulus of greater than about 1500 MPa, as measured according to ASTM D790 standard.

BRIEF DESCRIPTION OF THE DRAWINGS

The disclosure may be more completely understood in consideration of the following detailed description of various embodiments of the disclosure in connection with the accompanying drawings, in which.

Figure 1:
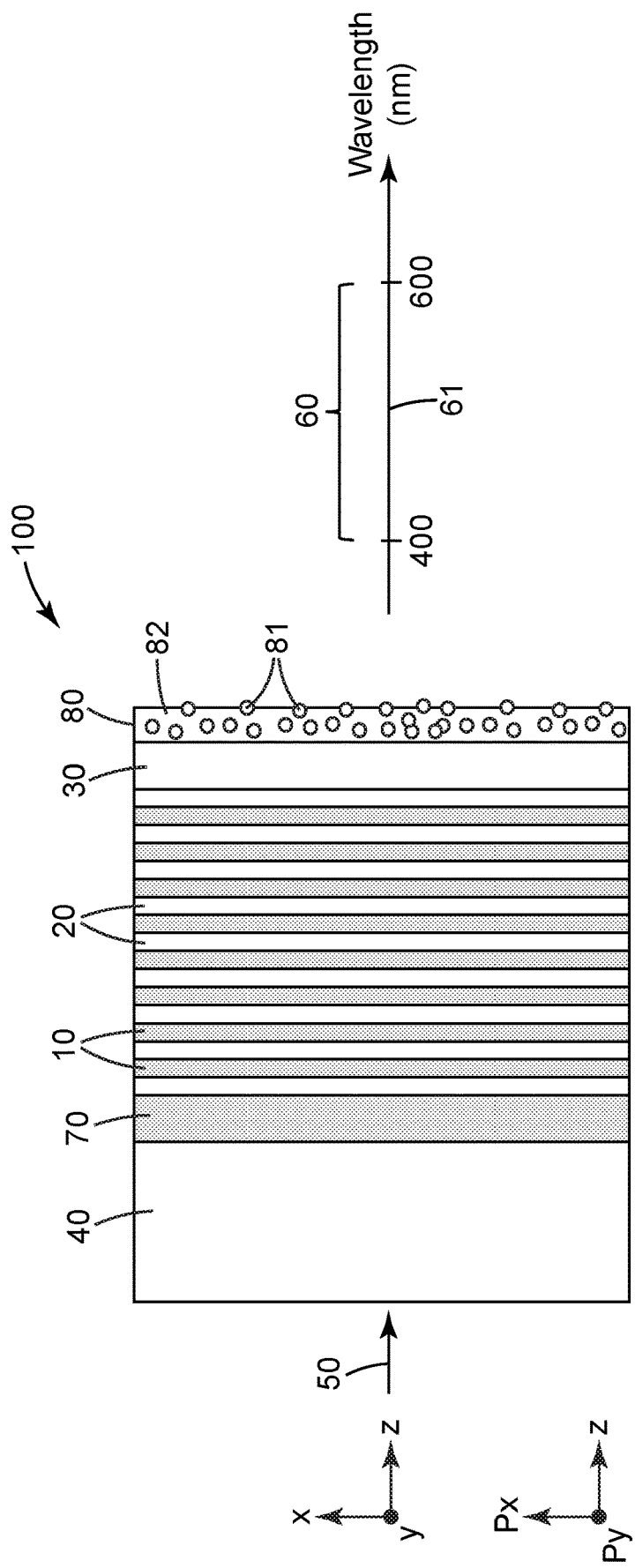
FIG. 1 is a cross-sectional view of a multi-layer optical film of this disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure as defined by the appended claims.

DETAILED DESCRIPTION

Polymeric films are used in a wide variety of applications. One particular use of polymeric films is in mirrors and reflective polarizers that reflect light of a given polarization or wavelength range. Such reflective films are used, for example, in conjunction with backlights in liquid crystal displays to enhance brightness. A reflective polarizing film may be placed between the user and the backlight to recycle the polarization state that becomes an image, thereby increasing brightness. A mirror film may be placed behind the backlight to reflect light towards the user; thereby enhancing brightness. Another use of polarizing films is in articles, such as sunglasses, to reduce light intensity and glare.

One type of polymer that is useful in creating polarizer or mirror films is a polyester. One example of a polyester-based polarizer includes a stack of polyester layers of differing composition. One configuration of this stack of layers includes a first set of birefringent layers and a second set of layers with an isotropic index of refraction. The second set of layers alternates with the birefringent layers to form a series of interfaces for reflecting light.

It is often desirable for the multi-layer reflective polarizer films to include relatively thick and rigid outer layers to serve to increase the rigidity and handleability of these films, especially since the individual layers of the multi-layer reflective polarizer films are so thin (typically, 55 to 130 nanometers) and in some instances there are relatively few layers. Typically, relatively thick and rigid outer layers are laminated to the multi-layer reflective polarizer films. There are a number of disadvantages to lamination of outer layers to multi-layer reflective polarizer films. Lamination is an extra step in the formation of the film article, and thus can add cost and manufacturing time to the preparation of the film articles. Also, lamination can add defects to film articles. Often adhesives are required to adhere the outer layer to the multi-layer reflective polarizer films, which again adds cost to the prepared articles and the presence of the adhesive layer can adversely affect the optical properties of the formed article. Additionally, often the outer layers are prepared from polymeric materials such as polycarbonates or polyesters that tend to add expense to the film articles. As mentioned above, the outer layers are relatively thick to provide the desired rigidity to the formed articles, and therefore the outer layers comprise a substantial portion of the mass of the formed article.

It would be desirable to utilize a relatively inexpensive polyester material in optical films such as mirror and reflective polarizer films. However, in order to achieve the desired optical effects and prepare optical films by co-extrusion, polyester materials have issues. Polyethylene Terephthalate (PET) is not co-stretchable with typical Reflective Polarizers (RPs). In typical RPs the high index optics (HIO) material is polyetheylene naphthalate (PEN) or a Co-polyethylene naphthalate (CoPEN) with a high mole fraction of the diacid being naphthalene dicarboxylate (NDC) (>75 mole %). If PET is co-stretched with RPs the temperature required is so high (~137 to 160° C. according to U.S. Pat. No. 5,882,774) that PET crystallizes before it is stretched. This type of crystallization is often called thermally induced crystallization instead of strain induced crystallization. This thermally crystallized PET is undesirable for a number of reasons. Thermally crystallized PET is hazy due to the presence of large crystallites, it tends to break before it is fully elongated when stretched in a tenter, and it does not have the excellent mechanical properties of strain hardened PET (high modulus and crystalline). A typical temperature for one dimensional orientation of reflective polarizers is 137 to 160° C. (based on examples in U.S. Pat. No. 5,882,774 with HIO being PEN). Multi-layer reflective polarizers typically use an HIO composed of PEN or CoPENs that are composed of 90 mole % or more of NDC. For colder temperatures the HIO will break or be hazy. Typical one-dimensional orientation temperatures for PET are 95° C. (see U.S. Pat. No. 9,664,834). Thus, there is clearly no overlap in the orientation temperatures between that used for HIOs that demonstrate the high birefringence required for RPs and PET which has low cost and good mechanical properties for rigid films. Thus, the use of PET in the films of this disclosure is unexpected.

In this disclosure, optical films are described that include multi-layer reflective polarizer films that include skin layers that are prepared from polyester materials of PET (polyethylene terephthalate), and are co-extruded with the optically active micro-layers so that additional outer layer lamination is not required. The multi-layer reflective polarizer films may be mirror-like films which reflect essentially all light or reflective polarizer films that reflect light of one polarity and transmit light of an orthogonal polarity. The polyester materials in the skin layers permit the preparation of the optical films by coextrusion and therefore avoid the added cost and time of lamination processes. Additionally, the relatively low cost of PET materials reduces the cost of the formed articles relative to articles formed with more expensive skin layers. Additionally, since the PET skin layers have compatible stretching properties to the optically active layers of the multi-layer portion of the films, the coextruded articles can be stretched to form film articles that have the desired optical and physical properties.

For the following defined terms, these definitions shall be applied, unless a different definition is given in the claims or elsewhere in this specification.

The term "polymer" will be understood to include polymers, copolymers (e.g., polymers formed using two or more different monomers), oligomers and combinations thereof, as well as polymers, oligomers, or copolymers that can be formed in a miscible blend by, for example, coextrusion or reaction, including transesterification. Both block and random copolymers are included, unless stated otherwise.

Unless otherwise stated, all numbers expressing quantities of ingredients, properties such as molecular weight, reaction conditions, and so forth used in the specification and claims are to be understood as being modified in all instances by the term "about." Accordingly, unless stated to the contrary, the numerical parameters set forth in the foregoing specification and attached claims are approximations that can vary depending upon the desired properties sought to be obtained by those skilled in the art utilizing the teachings of the present disclosure.

Mole percent or mol % and the like are synonyms that refer to the concentration of a substance as the moles of that substance divided by the moles of the composition and multiplied by 100. Similarly, weight % refers to the amount by weight of a substance in a composition divided by the total weight of the composition multiplied by 100.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" include plural referents unless the content clearly dictates otherwise. Thus, for example, reference to a composition containing "a polymer" includes a mixture of two or more polymers. As used in this specification and the appended claims, the term "or" is generally employed in its sense including "and/or" unless the content clearly dictates otherwise.

Disclosed herein are multi-layer optical films. In some embodiments, the optical film comprises an optically active portion comprising a plurality of alternating polymeric first and second interference layers, where the number of layers is greater than 50, where the optically active portion is disposed between, and integrally formed with, first and second skin layers. The optical films may also contain additional layers as is described in detail below.

The multilayered polymer films of this disclosure may be used, for example, as an optical reflective polarizer or mirror. The film includes optical layers comprising alternating layers of first interference layers and second interference layers, as well as non-optical layers such as skin layers. The non-optical layers typically provide protection and rigidity to the film articles. The first interference layers are generally birefringent polymer layers which are uniaxially- or biaxially-oriented. The second interference layers may also be polymer layers which are birefringent and uniaxially- or biaxially-oriented. More typically, however, the second interference layers have an isotropic index of refraction which is different from at least one of the indices of refraction of the first interference layers after orientation. The methods of manufacture and use, as well as design considerations for the multilayered polymer films are described, for example, in U.S. Pat. No. 5,882,774 and U.S. 2001/0011779A1.

FIG. 1 shows a cross-sectional view of an embodiment of a multilayer optical film of this disclosure. Optical film 100 comprises a plurality of alternating polymeric first interference layers 10 and second interference layers 20, where the number of layers is greater than 50. In some embodiments, the number of layers is greater than 100. The alternating polymeric first interference layers 10 and second interference layers 20, are disposed between, and integrally formed with, first skin layer 30 and second skin layer 40.

For substantially normally incident light 50 and for each wavelength in a predetermined wavelength range 60 extending at least from about 430 nanometers (nm) to about 600 nm, the optical film has an optical reflectance of at least 40% for a first polarization state (Px). In some embodiments, the predetermined wavelength range extends at least from about 400 nm to about 650 nm, or at least from about 430 nm to about 650 nm, or from about 400 to about 600 nm. In some embodiments, the optical film has an optical reflectance of at least 50%, at least 60% or even at least 70% for a first polarization state (Px).

Each of the first and second interference layers has an average thickness less than about 250 nm. The adjacent first and second interference layers have respective in plane indices of refraction n1x and n2x along the first polarization state (Px), n1y and n2y along an orthogonal second polarization state (Py), and n1z and n2z along a z-axis orthogonal to the first and second polarization states. For at least one wavelength 61 in the predetermined wavelength range 60 extending from at least about 430 nm to at least about 600 nm, n1x is greater than each of n1y and n1z by at least 0.14. The difference between n1y and n1z is greater than about 0.07. The maximum difference between n2x, n2y and n2z is less than about 0.01, and the difference between n1x and n2x is greater than about 0.14.

The first skin layer 30 has a first composition comprising polyester and the first interference layers 10 have a second composition comprising polyester. In some embodiments, the first and second compositions are substantially the same composition. A wide range of polyesters are suitable for the first and second compositions. Polyesters include carboxylate and glycol subunits and are generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules.

Suitable carboxylate monomer molecules for use in forming the carboxylate subunits of the polyester layers include, for example, 2,6-naphthalene dicarboxylic acid and isomers thereof; terephthalic acid; isophthalic acid; phthalic acid; azelaic acid; adipic acid; sebacic acid; norbornene dicarboxylic acid; bi-cyclooctane dicarboxylic acid; 1,6-cyclohexane dicarboxylic acid and isomers thereof; t-butyl isophthalic acid, tri-mellitic acid, sodium sulfonated isophthalic acid; 4,4-biphenyl dicarboxylic acid and isomers thereof; and lower alkyl esters of these acids, such as methyl or ethyl esters. The term "lower alkyl" refers, in this context, to $C_1$-$C_{10}$ straight-chained or branched alkyl groups. Also included within the term "polyester" are polycarbonates which are derived from the reaction of glycol monomer molecules with esters of carbonic acid, and blends of polycarbonates with copolyesters made from the above comonomers.

Suitable glycol monomer molecules for use in forming glycol subunits of the polyester layers include ethylene glycol; propylene glycol; 1,4-butanediol and isomers thereof; 1,6-hexanediol; neopentyl glycol; polyethylene glycol; diethylene glycol; tricyclodecanediol; 1,4-cyclohexanedimethanol and isomers thereof; 2-butyl-2-ethyl-1,3-propane diol; 2,2,4-triethyl-1,3-pentane diol; norbornanediol; bicyclo-octanediol; trimethylol propane; pentaerythritol; 1,4-benzenedimethanol and isomers thereof; bisphenol A; 1,8-dihydroxy biphenyl and isomers thereof; and 1,3-bis(2-hydroxyethoxy)benzene.

1,4-cyclohexane dimethanol (chdm) also has been found useful for some exemplary embodiments of the present disclosure due to the inverse effect it has on the polymer properties of glass transition temperature and refractive index. Increasing the mol portion of chdm can increase the glass transition temperature of the copolymer while at the same time decrease its refractive index. In particular, copolyesters containing both tbia and chdm were found to have relatively high glass transition temperatures for their respective refractive indices.

Among the most suitable polyester materials for use in the first and second compositions, i.e. for the first interference layers 10 and the first skin layer 30, are PET, PEN, coPEN, and copolymers comprising between about 1-20 mole % cyclohexane dimethanol and about 80-99 mole % ethylene glycol. The materials are understood by one of skill in the art, and PET is polyethylene terephthalate, PEN is polyethylene naphthalate, coPEN is co(polyethylene naphthalate). In some embodiments, these coPEN copolymers include carboxylate subunits which are derived from 10 to 50 mol % naphthalate dicarboxylate or 30 to 90 mol % t-butyl-isophthalic acid (TBIA) or an ester thereof and terephthalate may optionally be present up to 100 mol % or 0 to 100 mol %.

In some embodiments where the first and second compositions are the same, the first and second compositions comprise at least 70% by weight of PET, at least 80% by weight of PET, or even at least 90% by weight of PET. In other embodiments, the first and second compositions comprise at least 20% by weight of co(polyethylene naphthalate) (coPEN) and at least 40% by weight of PET. In other embodiments, the first and second compositions comprise at least 20% by weight of polyethylene naphthalate (PEN) and at least 40% by weight of PET. In some embodiments, the first and second compositions comprise a copolymer comprising between about 20-60 mole % cyclohexane dimethanol and about 40-80 mole % ethylene glycol.

In other embodiments, the first and second compositions are different compositions, although each composition comprises polyester. In some of the embodiments where the first and second compositions are different, the composition of the first skin layer and of the composition of the second interference layer are substantially the same. The second interference layer and the composition thereof are discussed in further detail below.

The first skin layer can have a wide variety of thicknesses as well as a wide variety of compositions. In some embodiments, the first skin layer has an average thickness between about 0.5 and 20 micrometers. In other embodiments, the first skin layer has an average thickness that is greater than about 2 micrometers.

The second interference layer can also have a wide range of compositions and thicknesses. The composition of the second interference is different from the composition of the first interference so as to give the desired optical effect. In some embodiments, the second interference layer comprises a majority of a polyester or copolyester material, in other embodiments the second interference layer comprises a majority of one or more (meth)acrylate materials. Examples of suitable polyester and copolyester materials are described above. In addition to the above materials, in some embodiments, the copolyester comprises a copolyester ether such as NEOSTAR ELASTOMER FN007 commercially available from Eastman Chemical Company are also suitable. The term "(meth)acrylate" as used herein refers to both acrylate and methacrylate materials. Acrylates and methacrylates are esters of acrylic acid or methacrylic acid, generally prepared by the reaction of the acid with an alcohol. Particularly suitable (meth)acrylate materials are polymers (PMMA) and copolymers (coPMMA) of MMA (methyl methacrylate). An example of a suitable coPMMA material is a copolymer of 75% by weight MMA and 25% by weight of ethyl acrylate such as PERSPEX CP63 commercially available from Ineos Acrylics, Inc.

In some embodiments, the second interference layer comprises a majority of polyester materials. Particularly suitable materials are PET and copolyester such as a copolyester ether. In some embodiments, the second interference layer comprises at least 80% by weight of PET, at least 90% by weight of PET, or even at least 95% by weight of PET. In other embodiments, the second interference layer comprises at least 80% by weight of a copolyester, least 90% by weight of a copolyester, or at least 95% by weight of a copolyester.

In other embodiments, the second interference layer comprises at least 50% by weight of at least one (meth)acrylate. In other embodiments, second interference layer comprises at least 60% by weight of at least one (meth)acrylate, at least 70% by weight of at least one (meth)acrylate, at least 80% by weight of at least one (meth)acrylate, at least 90% by weight of at least one (meth)acrylate, or at least 95% by weight of at least one (meth)acrylate. In some embodiments, the (meth)acrylate comprises a coPMMA. In these embodiments, the second interference layer comprises at least 50% by weight of a coPMMA. In other embodiments, second interference layer comprises at least 60% by weight of a coPMMA, at least 70% by weight of a coPMMA, at least 80% by weight of a coPMMA at least 90% by weight of a coPMMA, or at least 95% by weight of a coPMMA.

As with the other layers, the second skin layer 40, can comprise a wide range of materials and a wide range of thicknesses. The second skin layer 40 comprises at least 70% by weight of polyethylene terephthalate (PET) and has an average thickness greater than about 50 micrometers. In some embodiments, the average thickness of the second skin layer is greater than about 100 micrometers or even greater than 150 micrometers. In some embodiments, the average thickness of the second skin layer is less than about 400 micrometers, or less than about 350 micrometers. In some embodiments, the second skin layer comprises at least 80% by weight PET, at least 85% by weight of PET, or about 90% by weight of PET. In some embodiments, the second skin layer further comprises at least 5% by weight of PETg. PETg (polyethylene terephthalate glycol) is a glycol modified PET, such as EASTAR COPOLYESTER GN007 from Eastman Chemical Company.

The multi-layer film articles of this disclosure may also comprise a variety of optional layers, as shown in FIG. 1. In some embodiments, the multi-layer article further comprises a first protective layer 70 disposed between the plurality of alternating polymeric first and second interference layers and the second skin layer 40. The first protective layer may have a wide range of material compositions. In some embodiments, the first protective layer and the first interference layers have substantially the same composition. The first protective layer may have a wide range of thicknesses. In some embodiments, the first protective layer has an average thickness between about 0.5 micrometers and about 20 micrometers.

In some embodiments, the multi-layer article further comprises a light diffusing layer 80 disposed on the first skin layer 30 opposite the plurality of alternating polymeric first and second interference layers. The light diffusing layer can have a wide variety of thicknesses. In some embodiments, the average thickness is between about 0.5 to about 12 micrometers. In some embodiments, the light diffusing layer comprises a plurality of particles 81 dispersed in a material 82. In some embodiments, the particles have a volume percentage of the total volume of the light diffusing layer of between about 40% to about 65%. In some embodiments, the material comprises a polyester (such as PET or polylactic acid) and a (meth)acrylate.

A wide range of particles are suitable. In some embodiments, the particles comprise a (meth)acrylate. In some embodiments, the particles comprise a polystyrene. In yet other embodiments, the particles comprise an inorganic material, such as glass. In some embodiments the average size of the particles is between about 1 micrometer to about 20 micrometers. In some embodiments, at least some of the particles in the plurality of particles protrude from a top surface of the light diffusing layer.

As mentioned above, the first and second skin layers are present in the multi-layer optical film article 100 to provide handleability and rigidity to the article. As the skin layers are relatively thick, it is desirable that they be prepared from relatively inexpensive materials, and that these layers be co-processable with the first and second interference layers. In some specific embodiments, the multi-layer optical film 100 comprises a plurality of alternating polymeric first 10 and second 20 polymeric layers numbering greater than 50 and disposed between, and integrally formed with, first 30 and second 40 skin layers. In these embodiments, the first skin and the first and second polymeric layers have respective first and second compositions comprising polyester, where the second skin layer comprises at least 70% by weight of polyethylene terephthalate (PET), and the first and second skin layers, in combination, comprise at least 70% by volume of polyester. For substantially normally incident light 50 and for each wavelength in a predetermined wavelength range 60 extending at least from about 400 nm to about 600 nm, the multi-layer optical film has an optical reflectance of at least 50% for a first polarization state (Px). In some embodiments, the first and second skin layers, in combination, comprise at least 80% by volume of polyester.

In some embodiments, the multi-layer optical film article 100 is formed integrally and has an average thickness greater than about 200 micrometers, or an average thickness greater than about 250 micrometers.

A wide variety of methods can be used to describe the relative rigidity of the multi-layer optical articles of this disclosure. In some embodiments, the multi-layer optical articles have a flexural modulus of greater than about 1500 MPa, as measured according to the ASTM D790 test method.

In some specific embodiments, the multi-layer optical film 100 comprises a plurality of alternating polymeric first 10 and second 20 polymeric layers numbering greater than 50 and disposed between, and integrally formed with, first 30 and second 40 skin layers, where the first skin and the first and second polymeric layers have respective first and second compositions comprising polyester. The second skin layer comprises at least 70% by weight of polyethylene terephthalate (PET). For substantially normally incident light 50 and for each wavelength in a predetermined wavelength range 60 extending at least from about 400 nm to at least about 600 nm, the optical film has an optical reflectance of at least 50% for a first polarization state (Px), and the optical film has a flexural modulus of greater than about 1500 MPa, as measured according to the ASTM D790 standard test method.

In some embodiments, the multi-layer optical film 100 has mirror-like properties, having an optical reflectance of at least 50% for the second polarization state (Py). In some embodiments, the optical reflectance is at least 60% or even 70% for the second polarization state (Py).

In some embodiments of the multi-layer mirror films the film 100 comprises a plurality of alternating polymeric first 10 and second 20 interference layers numbering greater than 100 and disposed between, and integrally formed with, first 30 and second 40 skin layers, where each of the first and second interference layers has an average thickness less than about 250 nm, and the first skin and the interference layers having respective first and second compositions comprising polyester. The second skin layer comprises at least 70% by weight of polyethylene terephthalate (PET) and had an average thickness of greater than about 100 micrometers. For substantially normally incident light 50 and for each wavelength in a predetermined wavelength range 60 extending at least from about 400 nm to at least about 600 nm, the optical film has an optical reflectance of at least 50% for each of orthogonal first (Px) and second (Py) polarization states. The adjacent first and second interference layers have respective in plane indices of refraction of: n1x and n2x along the first polarization state; n1y and n2y along the second polarization state; and n1z and n2z along a z-axis orthogonal to the first and second polarization states. For at least one wavelength 61 in the predetermined wavelength range 60: n1x is greater than each of n1y and n1z by at least 0.14; the difference between n1y and n1z is greater than about 0.07; the maximum difference between n2x, n2y and n2z is less than about 0.01; and the difference between n1x and n2x is greater than about 0.14.

In some embodiments the multi-layer optical film 100 is a reflective polarizer, having optical transmittance of at least 60% for the second polarization state (Py). In some embodiments, the optical transmittance is at least 70% or even 80% for the second polarization state (Py).

The multi-layer optical films of the present disclosure can be prepared in a variety of different ways. As was mentioned above, an advantage of the present disclosure is the simple and straightforward techniques that can be used to prepare the article. One particularly suitable technique for forming the articles is co-extrusion. Co-extrusion techniques are well understood by one of skill in the art. In some embodiments, the plurality of alternating polymeric first and second interference layers and the first and second skin layers are co-extruded. In some embodiments, the plurality of alternating polymeric first and second interference layers and the first and second skin layers are further co-stretched at a temperature between about 190 and 220° F.

In this method, the multi-layer optical film is formed by co-extruding the plurality of alternating polymeric first and second interference layers and the first and second skin layers, and in some embodiments, the optical film is further formed by co-stretching the plurality of alternating polymeric first and second interference layers and the first and second skin layers at a temperature between about 190 and 220° F.

In some embodiments, the multi-layer optical film may contain additional optional layers as described above. In some embodiments, the multi-layer optical film further comprises a light diffusing layer. In some embodiments, the light diffusing layer is co-extruded with the plurality of alternating polymeric first and second interference layers and the first and second skin layers. In other embodiments, the light diffusing layer is coated on the plurality of alternating polymeric first and second interference layers.

Figure 2:
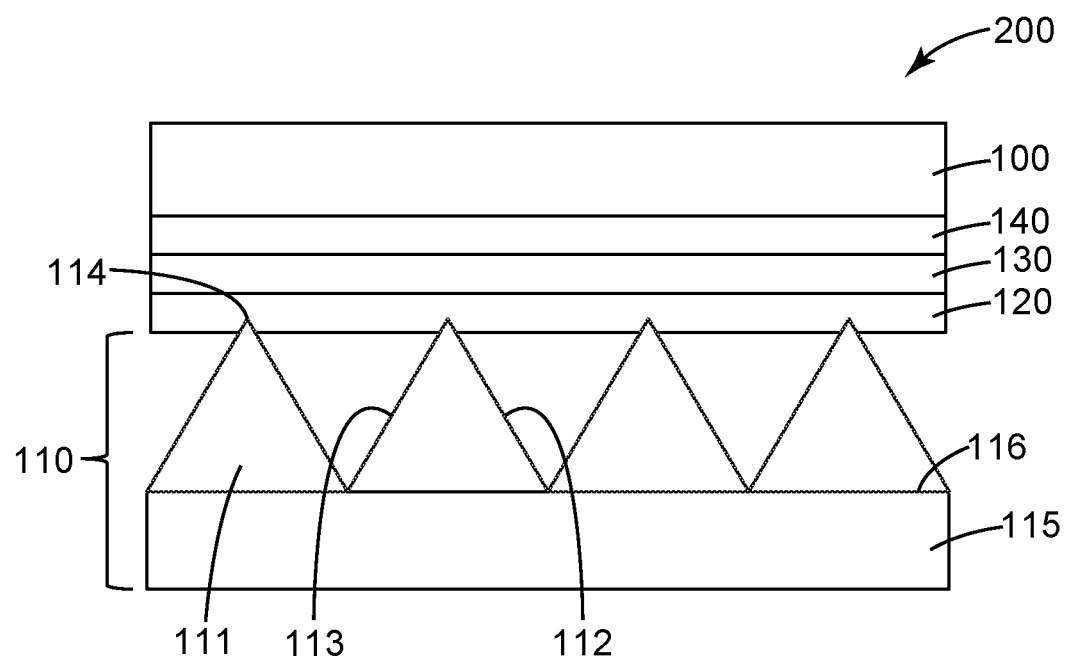
FIG. 2 is a cross-sectional view of an optical stack article of this disclosure.

Also disclosed herein are optical stack articles that comprise a multi-layer optical film article such as those described by FIG. 1 above. An embodiment of an optical stack article is shown in FIG. 2. In FIG. 2, optical stack 200 comprises a structured film 110 comprising a plurality of structures 111, each structure comprising opposing facets 112, and 113 meeting at a peak 114 with the multi-layered optical film article 100 disposed on the peaks of the structures. A first adhesive layer 120 bonds the optical film 100 to the peaks 114 of the structures 111. The optical stack has a flexural modulus of greater than about 1500 MPa, as measured according to the ASTM D790 test method. In some embodiments, the plurality of structures 111 are embedded in the first adhesive layer 120 as shown in FIG. 2. In some embodiments, the structured film 110 further comprises a first substrate 115, where the plurality of structures 111 are disposed on a major surface 116 of the first substrate 115.

Besides the structured film 110 and the multi-layered film article 100, the optical stack article can contain a variety of additional layers and features. In some embodiments the optical stack further comprises a second substrate 130 disposed between the optical film and the first adhesive layer, and a second adhesive layer 140 bonding the second substrate to the multi-layer optical film article 100. A wide range of optically clear adhesives are suitable for use as the adhesive layers 120 and 140. The adhesive layers may be the same or different.

The current disclosure includes the following embodiments:

Embodiment 1 is an optical film (100) comprising a plurality of alternating polymeric first (10) and second (20) interference layers numbering greater than 50 and disposed between, and integrally formed with, first (30) and second (40) skin layers, each of the first and second interference layers having an average thickness less than about 250 nm, the first skin and the first interference layers having respective first and second compositions comprising polyester, the second skin layer comprising at least 70% by weight of polyethylene terephthalate (PET) and having an average thickness greater than about 50 micrometers, for substantially normally incident light (50) and for each wavelength in a predetermined wavelength range (60) extending at least from about 430 nm to at least about 600 nm, the optical film having an optical reflectance of at least 40% for a first polarization state (Px), adjacent first and second interference layers having respective in plane indices of refraction: n1x and n2x along the first polarization state, n1y and n2y along an orthogonal second polarization state (Py), and n1z and n2z along a z-axis orthogonal to the first and second polarization states, such that for at least one wavelength (61) in the predetermined wavelength range: n1x is greater than each of n1y and n1z by at least 0.14; a difference between n1y and n1z is greater than about 0.07; a maximum difference between n2x, n2y and n2z is less than about 0.01; and a difference between n1x and n2x is greater than about 0.14.

Embodiment 2 is the optical film of embodiment 1, wherein the average thickness of the second skin layer is less than about 400 micrometers.

Embodiment 3 is the optical film of embodiment 1 or 2, wherein the average thickness of the second skin layer is less than about 350 micrometers.

Embodiment 4 is the optical film of any of embodiments 1-3, wherein the second skin layer comprising at least 80% by weight of polyethylene terephthalate (PET).

Embodiment 5 is the optical film of any of embodiments 1-4, wherein the first and second compositions are substantially a same composition comprising polyester.

Embodiment 6 is the optical film of any of embodiments 1-4, wherein the first and second compositions are different compositions, each comprising polyester.

Embodiment 7 is the optical film of any of embodiments 1-6, having an optical reflectance of at least 60% for a first polarization state.

Embodiment 8 is the optical film of any of embodiments 1-7, having an optical reflectance of at least 70% for a first polarization state.

Embodiment 9 is the optical film of any of embodiments 1-8, wherein the plurality of alternating polymeric first and second interference layers number greater than 100.

Embodiment 10 is the optical film of any of embodiments 1-9, wherein the average thickness of the second skin layer is greater than about 100 micrometers.

Embodiment 11 is the optical film of any of embodiments 1-10, wherein the predetermined wavelength range (60) extends from about 430 nm to about 650 nm.

Embodiment 12 is the optical film of any of embodiments 1-10, wherein the predetermined wavelength range (60) extends from about 400 nm to about 650 nm.

Embodiment 13 is the optical film of any of embodiments 1-12, having an optical reflectance of at least 50% for the first polarization state (Px).

Embodiment 14 is the optical film of any of embodiments 1-13, wherein the difference between n1y and n1z is greater than about 0.07.

Embodiment 15 is the optical film of any of embodiments 1-14, wherein the first skin layer and the second interference layers have substantially a same composition.

Embodiment 16 is the optical film of any of embodiments 1-15, having an optical reflectance of at least 50% for the second polarization state.

Embodiment 17 is the optical film of any of embodiments 1-16, having an optical reflectance of at least 60% for the second polarization state.

Embodiment 18 is the optical film of any of embodiments 1-17, having an optical reflectance of at least 70% for the second polarization state.

Embodiment 19 is the optical film of any of embodiments 1-15, having an optical transmittance of at least 60% for the second polarization state.

Embodiment 20 is the optical film of any of embodiments 1-15, having an optical transmittance of at least 70% for the second polarization state.

Embodiment 21 is the optical film of any of embodiments 1-15, having an optical transmittance of at least 80% for the second polarization state.

Embodiment 22 is the optical film of any of embodiments 1-21, wherein the first skin and interference layers comprise at least 70% by weight of PET.

Embodiment 23 is the optical film of any of embodiments 1-22, wherein the first skin and interference layers comprise at least 80% by weight of PET.

Embodiment 24 is the optical film of any of embodiments 1-23, wherein the first skin and interference layers comprise at least 90% by weight of PET.

Embodiment 25 is the optical film of any of embodiments 1-24, wherein the first skin and interference layers comprise at least 20% by weight of co(polyethylene naphthalate) (coPEN) and at least 40% by weight of PET.

Embodiment 26 is the optical film of any of embodiments 1-24, wherein the first skin and interference layers comprise at least 20% by weight of polyethylene naphthalate (PEN) and at least 40% by weight of PET.

Embodiment 27 is the optical film of any of embodiments 1-24, wherein the first skin and interference layers comprise a polyester with diol moieties between about 20-60 mole % cyclohexane dimethanol and about 40-80 mole % ethylene glycol.

Embodiment 28 is the optical film of any of embodiments 1-27, wherein the second skin layer comprises at least 85% by weight of PET.

Embodiment 29 is the optical film of any of embodiments 1-28, wherein the second skin layer comprises about 90% by weight of PET.

Embodiment 30 is the optical film of any of embodiments 1-29, wherein the second skin layer further comprises at least about 5% by weight of PETg.

Embodiment 31 is the optical film of any of embodiments 1-30, wherein the second interference layer comprises at least 80% by weight of PET.

Embodiment 32 is the optical film of any of embodiments 1-31, wherein the second interference layer comprises at least 90% by weight of PET.

Embodiment 33 is the optical film of any of embodiments 1-32, wherein the second interference layer comprises at least 95% by weight of PET.

Embodiment 34 is the optical film of any of embodiments 1-27, wherein the second interference layer comprises at least 50% by weight of a coPMMA.

Embodiment 35 is the optical film of any of embodiments 1-27, wherein the second interference layer comprises at least 60% by weight of a coPMMA.

Embodiment 36 is the optical film of any of embodiments 1-27, wherein the second interference layer comprises at least 70% by weight of a coPMMA.

Embodiment 37 is the optical film of any of embodiments 1-27, wherein the second interference layer comprises at least 80% by weight of a coPMMA.

Embodiment 38 is the optical film of any of embodiments 1-27, wherein the second interference layer comprises at least 90% by weight of a coPMMA.

Embodiment 39 is the optical film of any of embodiments 1-27, wherein the second interference layer comprises at least 95% by weight of a coPMMA.

Embodiment 40 is the optical film of any of embodiments 1-27, wherein the second interference layer comprises at least 50% by weight of at least one (meth)acrylate.

Embodiment 41 is the optical film of any of embodiments 1-27, wherein the second interference layer comprises at least 60% by weight of at least one (meth)acrylate.

Embodiment 42 is the optical film of any of embodiments 1-27, wherein the second interference layer comprises at least 70% by weight of at least one (meth)acrylate.

Embodiment 43 is the optical film of any of embodiments 1-27, wherein the second interference layer comprises at least 80% by weight of at least one (meth)acrylate.

Embodiment 44 is the optical film of any of embodiments 1-27, wherein the second interference layer comprises at least 90% by weight of at least one (meth)acrylate.

Embodiment 45 is the optical film of any of embodiments 1-27, wherein the second interference layer comprises at least 95% by weight of at least one (meth)acrylate.

Embodiment 46 is the optical film of any of embodiments 1-27, wherein the second interference layer comprises at least 80% by weight of a copolyester.

Embodiment 47 is the optical film of any of embodiments 1-27, wherein the second interference layer comprises at least 90% by weight of a copolyester.

Embodiment 48 is the optical film of any of embodiments 1-27, wherein the second interference layer comprises at least 95% by weight of a copolyester.

Embodiment 49 is the optical film of any of embodiments 1-48, wherein the second skin layer has an average thickness greater than about 150 micrometers.

Embodiment 50 is the optical film of any of embodiments 1-49, formed integrally and having an average thickness greater than about 200 micrometers.

Embodiment 51 is the optical film of any of embodiments 1-50, formed integrally and having an average thickness greater than about 250 micrometers.

Embodiment 52 is the optical film of any of embodiments 1-51, wherein the first skin layer has an average thickness greater than about 2 micrometers.

Embodiment 53 is the optical film of any of embodiments 1-51, wherein the first skin layer has an average thickness between about 0.5 and 20 micrometers.

Embodiment 54 is the optical film of any of embodiments 1-53, wherein the plurality of alternating polymeric first and second interference layers and the first and second skin layers are co-extruded.

Embodiment 55 is the optical film of embodiment 54, wherein the plurality of alternating polymeric first and second interference layers and the first and second skin layers are further co-stretched at a temperature between about 190 and 220° F.

Embodiment 56 is the optical film of any of embodiments 1-53, formed by co-extruding the plurality of alternating polymeric first and second interference layers and the first and second skin layers.

Embodiment 57 is the optical film of embodiment 56, further formed by co-stretching the plurality of alternating polymeric first and second interference layers and the first and second skin layers at a temperature between about 190 and 220° F.

Embodiment 58 is the optical film of any of embodiments 1-57, having a flexural modulus of greater than about 1500 MPa, as measured according to ASTM D790 standard.

Embodiment 59 is the optical film of any of embodiments 1-58, further comprising a first protective layer (70) disposed between the plurality of alternating polymeric first and second interference layers and the second skin layer.

Embodiment 60 is the optical film of embodiment 59, wherein the first protective layer and the first interference layers have substantially a same composition.

Embodiment 61 is the optical film of embodiment 59 or 60, wherein the first protective layer has an average thickness between about 0.5 micrometers and about 20 micrometers.

Embodiment 62 is the optical film of any of embodiments 1-61, further comprising a light diffusing layer (80) disposed on the first skin layer opposite the plurality of alternating polymeric first and second interference layers.

Embodiment 63 is the optical film of embodiment 62, wherein the light diffusing layer is co-extruded with the plurality of alternating polymeric first and second interference layers and the first and second skin layers.

Embodiment 64 is the optical film of embodiment 62, wherein the light diffusing layer is coated on the plurality of alternating polymeric first and second interference layers.

Embodiment 65 is the optical film of embodiment 62, wherein the light diffusing layer comprises a plurality of particles (81) dispersed in a material (82).

Embodiment 66 is the optical film of embodiment 65, wherein the particles comprise an acrylate.

Embodiment 67 is the optical film of embodiment 65, wherein the particles comprise an inorganic material.

Embodiment 68 is the optical film of embodiment 67, wherein the inorganic material comprises glass.

Embodiment 69 is the optical film of embodiment 65, wherein the particles comprise a polystyrene.

Embodiment 70 is the optical film of any of embodiments 65-69, wherein the particles have a volume percentage of a total volume of the light diffusing layer between about 40% to about 65%.

Embodiment 71 is the optical film of any of embodiments 65-70, wherein an average size of the particles is between about 1 micron to about 20 micrometers.

Embodiment 72 is the optical film of any of embodiments 65-71, wherein the material comprises polyester and an acrylate.

Embodiment 73 is the optical film of any of embodiments 62-72, wherein the light diffusing layer has an average thickness between about 0.5 to about 12 micrometers.

Embodiment 74 is the optical film of any of embodiments 65-72, wherein at least some of the particles in the plurality of particles protrude from a top surface of the light diffusing layer.

Embodiment 75 is the optical film of any of embodiments 1-74, wherein the first and second skin layers, in combination, comprise at least 80% by volume of polyester.

Embodiment 76 is an optical stack (200) comprising: a structured film (110) comprising a plurality of structures (111), each structure comprising opposing facets (112, 113) meeting at a peak (114); the optical film of any of embodiments 1-75 disposed on the peaks of the structures; and a first adhesive layer (120) bonding the optical film to the peaks of the structures, the optical stack having a flexural modulus of greater than about 1500 MPa, as measured according to ASTM D790 standard.

Embodiment 77 is the optical stack of embodiment 76, wherein the peaks of at least some of the structures in the plurality of structures are embedded in the first adhesive layer.

Embodiment 78 is the optical stack of embodiment 76 or 77, wherein the structured film further comprises a first substrate (115), the plurality of structures disposed on a major surface (116) of the first substrate.

Embodiment 79 is the optical stack of any of embodiments 76-78, further comprising a second substrate (130) disposed between the optical film and the first adhesive layer, a second adhesive layer (140) bonding the second substrate to the optical film.

Embodiment 80 is an optical film (100) comprising a plurality of alternating polymeric first (10) and second (20) interference layers numbering greater than 100 and disposed between, and integrally formed with, first (30) and second (40) skin layers, each of the first and second interference layers having an average thickness less than about 250 nm, the first skin and the interference layers having respective first and second compositions comprising polyester, the second skin layer comprising at least 70% by weight of polyethylene terephthalate (PET) and having an average thickness greater than about 100 micrometers, for substantially normally incident light (50) and for each wavelength in a predetermined wavelength range (60) extending at least from about 400 nm to at least about 600 nm, the optical film having an optical reflectance of at least 50% for each of orthogonal first (Px) and second (Py) polarization states, adjacent first and second interference layers having respective in plane indices of refraction: n1x and n2x along the first polarization state, n1y and n2y along the second polarization state, and n1z and n2z along a z-axis orthogonal to the first and second polarization states, such that for at least one wavelength (61) in the predetermined wavelength range: n1x is greater than each of n1y and n1z by at least 0.14; a difference between n1y and n1z is greater than about 0.07; a maximum difference between n2x, n2y and n2z is less than about 0.01; and a difference between n1x and n2x is greater than about 0.14.

Embodiment 81 is an optical film (100) comprising a plurality of alternating polymeric first (10) and second (20) polymeric layers numbering greater than 50 and disposed between, and integrally formed with, first (30) and second (40) skin layers, the first skin and the first and second polymeric layers having respective first and second compositions comprising polyester, the second skin layer comprising at least 70% by weight of polyethylene terephthalate (PET), for substantially normally incident light (50) and for each wavelength in a predetermined wavelength range (60) extending at least from about 400 nm to at least about 600 nm, the optical film having an optical reflectance of at least 50% for a first polarization state (Px), the optical film having a flexural modulus of greater than about 1500 MPa, as measured according to ASTM D790 standard.

Embodiment 82 is an optical film (100) comprising a plurality of alternating polymeric first (10) and second (20) polymeric layers numbering greater than 50 and disposed between, and integrally formed with, first (30) and second (40) skin layers, the first skin and the first and second polymeric layers having respective first and second compositions comprising polyester, the second skin layer comprising at least 70% by weight of polyethylene terephthalate (PET), for substantially normally incident light (50) and for each wavelength in a predetermined wavelength range (60) extending at least from about 400 nm to about 600 nm, the optical film having an optical reflectance of at least 50% for a first polarization state (Px), wherein the first and second skin layers, in combination, comprise at least 70% by volume of polyester.

EXAMPLES

These examples are merely for illustrative purposes only and are not meant to be limiting on the scope of the appended claims. All parts, percentages, ratios, etc. in the examples and the rest of the specification are by weight, unless noted otherwise. The following abbreviations are used: lb=pounds; hr=hour. The terms "mol %", and "mole %" are used interchangeably, and define the percentage by moles of a component. Similarly, the terms "wt %" and "weight %" are used interchangeably and define the percentage of a component by weight.

Table of Abbreviations

| Abbreviation or Trade Designation | Description |
| --- | --- |
| PET | Polyethylene terephthalate with an intrinsic viscosity of 0.62 deciliters/gram from 3M Company, St. Paul, MN |
| PETg | Glycol modified co-polyester, commercially available from Eastman Chemicals, Knoxville, TN |
| CoPEN90-10 | A random polyester copolymer of co-polyethylene naphthalate in which the diol is 100 mol % ethylene glycol and the diacid is 90 mol % naphthalene dicarboxylic acid and 10 mol % dimethyl terephthalic acid. |
| PEN | polyethylene naphthalate homopolymer from 3M Company, St. Paul, MN |
| PHEN40 | A polyester copolymer where the diol moieties are approximately 40 mol % hexanediol and approximately 60 mol % ethylene glycol and the diacid/di-ester moieties are 100 mol % naphthalene dicarboxylic acid (or esters thereof). |
| CoPMMA | A PMMA copolymer made from 75 wt % methylmethacrylate (MMA) monomers and 25 wt % ethyl acrylate (EA) monomers, commercially available from Ineos Acrylics, Inc., under the trade designation "PERSPEX CP63" |
| CoPEEE | A copolyester ether elastomer with a refractive index of about 1.505 commercially available from Eastman Chemical, Kingsport, TN, as "NEOSTAR FN007" |
| HIO | High Index Optics, describes the optical layers described, for example in FIG. 1 as first interference layer 10 |
| LIO | Low Index Optics, describes the optical layers described, for example in FIG. 1 as second interference layer 20 |
| Wheel Side | Defines the side of a co-extruded article where material is fed onto the wheel side of a casting wheel, the optical layer described, for example, in FIG. 1 as skin layer 40 |
| Air Side | Defines the side of a co-extruded article where material is fed onto the air side of a casting wheel, the optical layer described, for example, in FIG. 1 as skin layer 30 |
| PBL | Protective Boundary Layer, prepared from HIO materials, described, for example in FIG. 1 as layer 70 |

Example 1

A multi-layer optical film was produced by using four extruders:
  HIO extruder: Feeds a feedblock that produces 88 layers. 20 wt % of this extruder output is diverted to protective boundary layers that are on each side of the micro-layer packet. A protective boundary layer is described in U.S. Pat. No. 5,882,774 and is a thick layer protecting the micro-layer packet from high shear rates
  LIO extruder: Feeds the same feedblock as the HIO extruder and produces 89 layers
  Air-side skin extruder: feeds skin on the air-side of the casting wheel. This extruder uses the same input material as the HIO so that the refractive index can be measured directly from the surface
  Wheel-side skin extruder: feeds skin on the wheel-side of the casting wheel For Example 1, the HIO, air-side skin, and LIO material are all feeding PET. The Wheel-side skin is 90 wt % PET and 10 wt % PETg. The PETg is added to explore compositions that may have superior mechanical properties compared with 100% PET (i.e., lower crystallinity).

The feedblock produces a single packet with 177 micro-layers. The layer profile is adjusted using axial rod heaters and adjusting casting speed (axial rods are described in U.S. Pat. No. 6,830,713) to have a left band-edge at approximately 400 nm and right band-edge at approximately 900 nm when the film is measured in transmission for block state at normal incidence.

The film was cast onto a casting wheel with the thinnest micro-layers toward the casting wheel. The film was then stretched in the transverse direction (TD) stretch ratio (TDSR) of 5.5 at a temperature of 222° F. (106° C.). The stretch ratio was obtained by drawing two marks on the unoriented web with markers and measuring the distance between the marks before and after stretching. The TDSR is the oriented distance divided by the un-oriented distance. The materials and process conditions for Examples 1-22 are presented in Table 1.

TABLE 1

Conditions and refractive indices for Examples 1 to 22

| Example | Material HIO and air side skin layer | HIO and PBL rate (lb/hr) | Air side rate (lb/hr) | LIO material | LiO rate (lb/hr) | Wheel side skin material | Wheel side skin rate (lb/hr) | Stretch Temp for 5.5 TDSR (° F.) |
|---|---|---|---|---|---|---|---|---|
| 1 | PET | 96 | 150 | PET | 82 | Mix D | 105 | 222 |
| 2 | PET | 96 | 150 | PET | 82 | Mix D | 105 | 216 |
| 3 | PET | 96 | 150 | PET | 82 | Mix D | 105 | 210 |
| 4 | PET | 96 | 150 | PET | 82 | Mix D | 105 | 204 |
| 5 | PET | 96 | 150 | PET | 82 | Mix D | 105 | 196 |
| 6 | Mix A | 96 | 150 | PET | 82 | Mix D | 150 | 192 |
| 7 | Mix A | 96 | 150 | PET | 82 | Mix D | 150 | 200 |
| 8 | Mix A | 96 | 150 | PET | 82 | Mix D | 150 | 208 |
| 9 | Mix A | 96 | 150 | PET | 82 | Mix D | 150 | 216 |
| 10 | Mix B | 96 | 150 | PET | 82 | Mix D | 150 | 208 |
| 11 | Mix B | 96 | 150 | PET | 82 | Mix D | 150 | 200 |
| 12 | Mix B | 96 | 150 | PET | 82 | Mix D | 150 | 192 |
| 13 | Mix C | 96 | 150 | PET | 82 | Mix D | 150 | 200 |
| 14 | Mix C | 96 | 150 | PET | 82 | Mix D | 150 | 208 |
| 15 | Mix C | 96 | 150 | PET | 82 | Mix D | 150 | 216 |
| 16 | Mix B | 96 | 150 | coPMMA | 93 | Mix D | 200 | 202 |
| 17 | Mix B | 96 | 200 | coPEEE | 93 | Mix D | 200 | 205 |
| 18 | Mix B | 96 | 200 | coPEEE | 93 | Mix D | 200 | 210 |
| 19 | Mix B | 96 | 200 | coPEEE | 93 | Mix D | 200 | 215 |
| 20 | PHEN40 | 96 | 200 | coPEEE | 93 | Mix D | 100 | 215 |
| 21 | PHEN40 | 96 | 200 | coPEEE | 93 | Mix D | 100 | 207 |
| 22 | PHEN40 | 96 | 200 | coPEEE | 93 | Mix D | 100 | 199 |

In Table 1: Mixture A (Mix A) is a 50/50 by weight mixture of CoPEN90-10/PET; Mixture B (Mix B) is a 40/60 by weight mixture of CoPEN90-10/PET; Mixture C (Mix C) is a 30/70 by weight mixture of PEN/PET; Mixture D (Mix D) is 90/10 by weight mixture of PET/PETg.

The film was then measured for refractive index using a Metricon refractometer (Pennington, NJ) to determine the optical capability of a particular material. The wheel-side skin was measured to have a refractive index at 633 nm to 1.6574 while the wheel-side refractive index was measured to be 1.6500. In Table 2, the refractive indices are presented.

TABLE 2

Refractive Indices for Examples 1 to 22

| Example | Air side skin refractive Index (x) | Air side skin refractive Index (y) | Air side skin refractive Index (z) | RI difference (x − y) | RI difference (y − z) | Wheel side skin refractive index |
|---|---|---|---|---|---|---|
| 1 | 1.6574 | 1.5750 | 1.5420 | 0.0824 | 0.0330 | 1.6500 |
| 2 | 1.6700 | 1.5750 | 1.5280 | 0.0950 | 0.0470 | 1.6638 |
| 3 | 1.6816 | 1.5769 | 1.5254 | 0.1047 | 0.0515 | 1.6753 |
| 4 | 1.6854 | 1.5784 | 1.5159 | 0.1070 | 0.0625 | 1.6848 |
| 5 | 1.6956 | 1.5807 | 1.5078 | 0.1149 | 0.0729 | 1.6920 |
| 6 | 1.7502 | 1.5980 | 1.5221 | 0.1522 | 0.0759 | 1.6961 |
| 7 | 1.7532 | 1.5969 | 1.5021 | 0.1563 | 0.0948 | 1.6894 |
| 8 | 1.7516 | 1.5976 | 1.5049 | 0.1540 | 0.0927 | 1.6847 |
| 9 | 1.7463 | 1.5969 | 1.5239 | 0.1494 | 0.0730 | 1.6685 |
| 10 | 1.7438 | 1.5943 | 1.5175 | 0.1495 | 0.0768 | 1.6762 |
| 11 | 1.7460 | 1.6010 | 1.5153 | 0.1450 | 0.0857 | 1.6877 |
| 12 | 1.7455 | 1.5945 | 1.5150 | 0.1510 | 0.0795 | 1.6945 |
| 13 | 1.7428 | 1.5960 | 1.5080 | 0.1468 | 0.0880 | 1.6887 |
| 14 | 1.7398 | 1.5936 | 1.5122 | 0.1462 | 0.0814 | 1.6743 |

TABLE 2-continued

Refractive Indices for Examples 1 to 22

| Example | Air side skin refractive Index (x) | Air side skin refractive Index (y) | Air side skin refractive Index (z) | RI difference (x − y) | RI difference (y − z) | Wheel side skin refractive index |
|---|---|---|---|---|---|---|
| 15 | 1.7328 | 1.5936 | 1.5188 | 0.1392 | 0.0748 | 1.6650 |
| 16 | 1.7438 | 1.5962 | 1.5168 | 0.1476 | 0.0794 | 1.6836 |
| 17 | 1.7459 | 1.5962 | 1.5159 | 0.1497 | 0.0803 | 1.6882 |
| 18 | 1.7440 | 1.5946 | 1.5175 | 0.1494 | 0.0771 | 1.6782 |
| 19 | 1.7410 | 1.5948 | 1.5201 | 0.1462 | 0.0747 | 1.6747 |
| 20 | 1.8249 | 1.5973 | 1.5153 | 0.2276 | 0.0820 | 1.6780 |
| 21 | 1.8230 | 1.6031 | 1.5139 | 0.2199 | 0.0892 | 1.6877 |
| 22 | 1.8267 | 1.6001 | 1.5108 | 0.2266 | 0.0893 | 1.6959 |

What is claimed is:

1. An optical film comprising a plurality of alternating polymeric first and second interference layers numbering greater than 50 and disposed between, and integrally formed with, first and second skin layers,
   each of the first and second interference layers having an average thickness less than about 250 nm,
   the first skin and the first interference layers having respective first and second compositions comprising polyester,
   the second skin layer comprising at least 70% by weight of polyethylene terephthalate (PET) and having an average thickness greater than about 50 micrometers,
   for substantially normally incident light and for each wavelength in a predetermined wavelength range extending at least from about 430 nm to at least about 600 nm, the optical film having an optical reflectance of at least 40% for a first polarization state,
   adjacent first and second interference layers having respective in plane indices of refraction:
   n1x and n2x along the first polarization state,
   n1y and n2y along an orthogonal second polarization state,
   and n1z and n2z along a z-axis orthogonal to the first and second polarization states, such that for at least one wavelength in the predetermined wavelength range:
   n1x is greater than each of n1y and n1z by at least 0.14;
   a difference between n1y and n1z is greater than about 0.07;
   a maximum difference between n2x, n2y and n2z is less than about 0.01; and
   a difference between n1x and n2x is greater than about 0.14.

2. The optical film of claim 1, wherein the first skin and interference layers comprise a polyester with diol moieties between about 20-60 mole % cyclohexane dimethanol and about 40-80 mole % ethylene glycol.

3. The optical film of claim 1, wherein the second skin layer has an average thickness greater than about 150 micrometers.

4. The optical film of claim 1 formed integrally and having an average thickness greater than about 250 micrometers.

5. The optical film of claim 1, wherein the plurality of alternating polymeric first and second interference layers and the first and second skin layers are co-extruded.

6. The optical film of claim 5, wherein the plurality of alternating polymeric first and second interference layers and the first and second skin layers are further co-stretched at a temperature between about 190 and 220° F.

7. The optical film of claim 1 further comprising a light diffusing layer disposed on the first skin layer opposite the plurality of alternating polymeric first and second interference layers, wherein the light diffusing layer is co-extruded with the plurality of alternating polymeric first and second interference layers and the first and second skin layers.

8. The optical film of claim 1, wherein the first skin and interference layers comprise at least 90% by weight of PET.

9. The optical film of claim 1, wherein the first skin and interference layers comprise at least 20% by weight of co (polyethylene naphthalate) (coPEN) and at least 40% by weight of PET.

10. The optical film of claim 1, wherein the second interference layer comprises at least 70% by weight of a coPMMA.

11. The optical film of claim 1, wherein the second interference layer comprises at least 70% by weight of at least one (meth)acrylate.

12. The optical film of claim 1, wherein the first skin layer has an average thickness greater than about 2 micrometers.

13. The optical film of claim 1 having a flexural modulus of greater than about 1500 MPa, as measured according to ASTM D790 standard.

14. The optical film of claim 1, wherein the first and second skin layers, in combination, comprise at least 80% by volume of polyester.

15. The optical film of claim 1 further formed by co-stretching the plurality of alternating polymeric first and second interference layers and the first and second skin layers at a temperature between about 190 and 220° F.

16. An optical stack comprising:
   a structured film comprising a plurality of structures, each structure comprising opposing facets meeting at a peak;
   the optical film of claim 1 disposed on the peaks of the structures; and
   a first adhesive layer bonding the optical film to the peaks of the structures, the optical stack having a flexural modulus of greater than about 1500 MPa, as measured according to ASTM D790 standard.

17. The optical stack of claim 16, wherein the peaks of at least some of the structures in the plurality of structures are embedded in the first adhesive layer.

18. An optical film comprising a plurality of alternating polymeric first and second interference layers numbering greater than 100 and disposed between, and integrally formed with, first and second skin layers,
   each of the first and second interference layers having an average thickness less than about 250 nm,
   the first skin and the interference layers having respective first and second compositions comprising polyester, the second skin layer comprising at least 70% by weight of polyethylene terephthalate (PET) and having an average thickness greater than about 100 micrometers, for substantially normally incident light and for each wavelength in a predetermined wavelength range extending at least from about 400 nm to at least about 600 nm, the optical film having an optical reflectance of at least 50% for each of orthogonal first and second polarization states, adjacent first and second interference layers having respective in plane indices of refraction:
  $n1x$ and $n2x$ along the first polarization state,
  $n1y$ and $n2y$ along the second polarization state,
  and $n1z$ and $n2z$ along a z-axis orthogonal to the first and second polarization states, such that for at least one wavelength in the predetermined wavelength range:
  $n1x$ is greater than each of $n1y$ and $n1z$ by at least 0.14;
  a difference between $n1y$ and $n1z$ is greater than about 0.07;
  a maximum difference between $n2x$, $n2y$ and $n2z$ is less than about 0.01; and
  a difference between $n1x$ and $n2x$ is greater than about 0.14.

19. An optical film comprising a plurality of alternating polymeric first and second polymeric layers numbering greater than 50 and disposed between, and integrally formed with, first and second skin layers, the first skin and the first and second polymeric layers having respective first and second compositions comprising polyester, the second skin layer comprising at least 70% by weight of polyethylene terephthalate (PET), for substantially normally incident light and for each wavelength in a predetermined wavelength range extending at least from about 400 nm to at least about 600 nm, the optical film having an optical reflectance of at least 50% for a first polarization state, the optical film having a flexural modulus of greater than about 1500 MPa, as measured according to ASTM D790 standard.

20. An optical film comprising a plurality of alternating polymeric first and second polymeric layers numbering greater than 50 and disposed between, and integrally formed with, first and second skin layers, the first skin and the first and second polymeric layers having respective first and second compositions comprising polyester, the second skin layer comprising at least 70% by weight of polyethylene terephthalate (PET), for substantially normally incident light and for each wavelength in a predetermined wavelength range extending at least from about 400 nm to about 600 nm, the optical film having an optical reflectance of at least 50% for a first polarization state, wherein the first and second skin layers, in combination, comprise at least 70% by volume of polyester.

* * * * *